_United States Patent Office_ 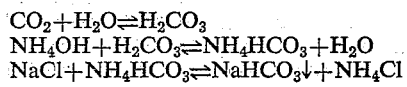

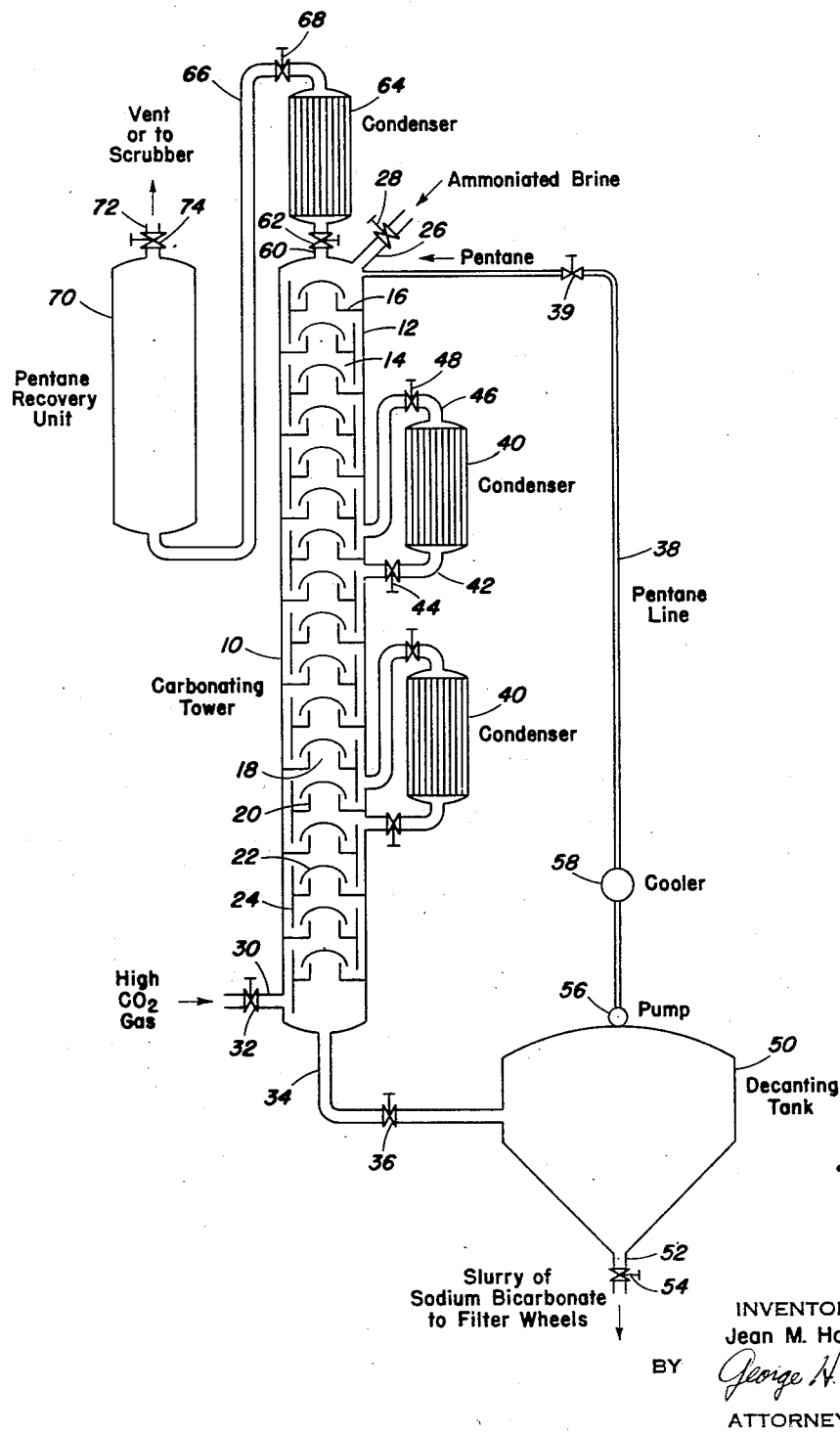

2,942,942
Patented June 28, 1960

2,942,942
CONTINUOUS PROCESS FOR PRODUCING
SODIUM BICARBONATE SLURRY

Jean M. Hoff, Wyandotte, Mich., assignor to Wyandotte Chemicals Corporation, Wyandotte, Mich., a corporation of Michigan Filed Nov. 1, 1957, Ser. No. 693,993

7 Claims. (Cl. 23—65)

This invention relates to ways and means for continuously removing heat from a liquid mixture of reactants undergoing exothermic reaction. More particularly, it relates to ways and means for continuously removing heat from a reaction system in which the reactants move countercurrently to one another.

There are many chemical reactions performed on a commercial scale in which so much heat of reaction is released that cooling must be provided in order for the reaction to proceed to completion or to a desired degree of completion. When performing such reactions (referred to as exothermic reactions) in reaction towers, it is common practice to pass the reaction mixture through air or water-cooled heat exchangers to remove released heat of reaction therefrom. The term "reaction tower" refers to a vessel wherein any number of stages of a reaction of a chemical or physical nature is performed. A common type of reaction tower which is frequently referred to in this application is the bubble cap, tray construction type.

In the operation of reaction towers and heat exchangers, however, corrosion and scaling are serious problems. Many times, the reaction mixture comprises components which are corrosive towards the materials of construction in the heat exchanger, resulting in equipment maintenance and replacement problems. Quite often, the cooling of a reaction mixture causes impurities and/or product in solution to precipitate on the heat transfer surfaces and form hard scale which seriously affects the heat transfer coefficient of the heat exchanger and thus causes a substantial reduction in the efficiency of the heat transfer unit.

Many reaction towers have a heat exchanger inside the tower, which means that, in the event of an equipment breakdown or other maintenance problems, operation of the entire tower must be stopped to permit necessary repairs. Although in many installations repairs are made outside the reaction tower (after pulling out the heat exchanger tubes or tube bundles), sometimes the tower must be cooled to a temperature at which personnel can safely work inside. Also, when internally mounted, the heat exchange unit offers a large proportion of surface area upon which scale may deposit.

Thus, the art has been faced with the problem of finding ways and means to avoid the problems of corrosion and scale deposition in heat exchange equipment associated with reaction towers.

This is especially true in the well-known ammonia-soda process for manufacturing sodium bicarbonate. Commercially, the reaction involved in the process is usually performed in reaction towers (referred to as carbonating towers) which may be as much as 70 to 80 feet or more in height. In this process, a gas stream consisting essentially of carbon dioxide is bubbled upwardly through a downflowing stream of ammoniated brine and the reaction proceeds approximately as indicated in the following equations:

$$CO_2 + H_2O \rightleftharpoons H_2CO_3$$
$$NH_4OH + H_2CO_3 \rightleftharpoons NH_4HCO_3 + H_2O$$
$$NaCl + NH_4HCO_3 \rightleftharpoons NaHCO_3\downarrow + NH_4Cl$$

An increase in the temperature of water tends to lower the water solubility of both carbon dioxide and ammonia while it tends to increase the water solubility of both the ammonium bicarbonate and the sodium bicarbonate. The temperature of reaction should therefore be established and maintained as low as possible for the maximum yield of product. On the other hand the over-all reaction (excluding the addition of ammonia to the brine) is exothermic, roughly two million B.t.u.'s being released per ton of $NaHCO_3$ formed. Consequently, under conditions of commercial operation, a substantial proportion of this released heat of reaction must be removed from the reaction stream in order to establish and maintain the optimum reaction temperature. Considering the height of the carbonating towers, the fact that solid sodium bicarbonate is present in the stream of reactants or "liquor," and the components of the "liquor," it can be appreciated that the problems of corrosion and scale deposition in the tower cooling units are of extreme concern to those in the art. These problems have not heretofore been satisfactorily solved by those in the art.

It is, therefore, a general object of this invention to provide the art with improved ways and means for transferring heat from a flowing, liquid reaction mass undergoing an exothermic chemical reaction.

Specifically, it is an object of this invention to develop ways and means of effecting heat transfer in the ammonia-soda process without the attendant scale deposition in the heat exchange equipment.

More specifically, it is an object of this invention to develop ways and means of transferring heat from flowing "liquor" in reaction towers without bringing said "liquor" into contact with the heat exchange means.

Still another specific object is to develop ways and means of transferring heat from flowing "liquor" in reaction towers without the use of heat exchange tubes and the like located inside the towers.

These and other objects which appear as this specification proceeds are achieved by this invention.

In summary, my invention involves the concept of mixing with the liquid reaction mixture an inert, liquid, heat transfer medium or agent having a lesser heat content than said mixture, absorbing in said agent heat of reaction and removing said agent from the reaction mass. Preferably, heat is then removed from the agent and the agent is returned to the liquid reaction mixture. Another concept is that the liquid, heat transfer agent be immiscible with the liquid reaction mixture in order to minimize its loss from the reaction-cooling system. Still another concept is that the liquid agent have a boiling point below that of the liquid reaction mixture and, more particularly, a boiling point low enough so that the agent will be vaporized by the heat of reaction. In this latter case, the agent vapor is removed from the reaction mixture and, preferably, heat is removed from said vapor until it liquefies, at which point the agent is returned to the reaction mixture.

In relation to reaction towers, it is a further concept of my invention to add the liquid agent to at least one of the reactants at or prior to the point at which said reactant is charged to the reaction tower, remove said agent from the product stream or other discharge stream, as by decantation or distillation, cool said agent and recycle it to the reaction tower. The natural agitation in the tower will usually be sufficient to obtain sufficient commingling of the heat transfer agent with liquid in the tower.

As the reaction commences to take place in the reaction tower, more heat of reaction may be released in certain sections of the tower than in others, due to the nature of the exothermic reaction, with the resultant formation of one or more so-called "hot zones." The location of these zones usually depends on local conditions and can be readily determined. It is a further concept of this invention that heat transfer agent be vaporized faster in said hot zones than elsewhere in the tower, the resultant vapor collected and conducted to a heat exchanger comprising cooling surfaces remotely placed with respect to the reaction mixture, the vapor be condensed therein to a liquid and the liquid be returned to the reaction stream. In the preferred embodiment of this invention, the cooling surfaces of the heat exchanger should be in the form of either an air or water-cooled heat exchanger externally located in relation to the reaction tower. By control of the heat duty of the exchanger, other vapors and gases which might pass off in combination with the heat transfer medium are permitted to pass through the exchanger (are not condensed) and, if of value in the reaction, are returned to the reaction tower in their gaseous form.

In the environment of the ammonia-soda process, this invention involves the addition of the inert, liquid heat transfer agent to the ammoniated brine before or at the point where it starts its downward flow in the carbonation tower. It also involves the addition of said agent to the liquor at one or more intermediate levels within the tower.

In such a system, the heat transfer agent leaves the bottom of the reaction tower along with the slurry of sodium bicarbonate. In the preferred embodiment of this invention it is preferred to use a heat transfer agent that is immiscible with water and in this connection kerosene, "heavy naphtha" (heavy end of gasoline) carbon tetrachloride, pentane, isopentane and mixtures of pentane and isopentane are mentioned by way of example as suitable heat transfer agents for this process. The heat transfer agent in such case is separated as by decantation, for example, from the slurry of sodium bicarbonate, cooled and recharged to the tower.

In many instances and particularly in the ammonia-soda process the volume of heat transfer agent required to absorb the requisite proportion of released heat of reaction to establish and maintain the desired optimum temperature may be so great as to reduce the capacity and economics of the reaction tower below practical limits. In such cases, although not limited thereto, a heat transfer agent having a boiling point at or near the desired temperature of reaction should be used. In the ammonia-soda process, pentane (boiling point at 760 mm. is 36° C.), isopentane (boiling point at 760 mm. is 28° C.) and mixtures thereof are representative of such a heat transfer agent. Although the natural agitation in the reaction tower will usually suffice for mixing the heat transfer agent with the tower liquors, the agent, as in the case of pentane, may not be quite dense enough for optimum mixing. This can be corrected by adding a secondary, denser, heat transfer liquid such as, for example, carbon tetrachloride, "heavy naphtha," kerosene and the like, to the primary heat transfer liquid to give the agent more nearly the same density as the liquor. In the ammonia-soda process it is preferred that secondary liquids be less dense than the liquor in order to prevent the secondary liquid from underlying the slurry in decantation tanks and the like. Thus, it is preferred not to use carbon tetrachloride and the like in the ammonia-soda process.

Under the vaporization concept of this invention the reaction tower is provided with one or more external heat exchange units of the condenser type. Usually a heat exchange unit is associated with a "hot zone." Vapors of heating agent and other gases in the "hot zone" which in the tray type reaction tower may comprise one or more compartments formed by the trays, are diverted therefrom and conveyed through conduits into the condensers. These conduits should be large enough to accommodate both vapors and condensed, returning agent.

One of the chief advantages of the vaporization method of heat transfer is that the heat transfer agent provides more effective cooling in that its optimum cooling effect is obtained automatically where it is most needed by boiling vigorously at that point. Thus, a reaction tower embodying this invention requires less operator skill than those currently in use.

Another advantage of this invention is that the heat exchangers are free from contact with possible corrosive liquor, thereby allowing the use of conventional, petroleum refinery type, condensers and heat exchangers manufactured from less expensive material instead of the more expensive, corrosion-resistant materials.

A further advantage is that under normal operative conditions little or no scale is deposited on the heat exchanger tubes since only gases and vapors contact them. Thus a smaller tube area can be used. Moreover, in comparison to reaction towers having internal heat exchangers, since the reaction towers need not have internal heat exchangers in the practice of this invention, although such can be used, particularly if they be mounted in gas pockets under sloping trays and the like, precipitated product such as sodium bicarbonate has much less chance to "hang-up" in the tower. Thus cleaning of the reaction tower is less frequent and as a routine matter can even be eliminated.

Still another advantage of the vaporization method of heat exchange is the ease with which maintenance can be performed on the heat exchangers or condensers since the invention enables one of a series of external condensers to be easily shut off from the tower for repairs without shutting down the tower.

A feature of advantage of the vaporization method of heat exchange is that the tower can be operated with little or no heat transfer agent escaping from the tower with the slurried product.

In addition to the ammonia-soda process this invention is applicable to other absorption operations involving a corrosive solution, such as found in the production of nitric acid, of muriatic acid and the like.

Before turning to the drawing, it should be understood that this invention may be embodied in several forms without departing from the spirit or essential characteristics thereof, wherefore, the embodiment to be described is illustrative and not restrictive inasmuch as the scope of the invention is defined by the appended claims rather than by the description preceding them.

Referring now to the drawing, it will be observed that there is shown a simplified flowsheet illustrating in diagrammatic form the carbonating tower for performing the ammonia-soda process, which tower has been adapted in accordance with this invention.

In more detail, there is shown diagrammatically a carbonating tower 10, formed by a cylindrical casing 12 divided internally into a series of superposed compartments 14 by a plurality of horizontally disposed trays 16. Each tray comprises at least one opening 18 associated with an upriser 20 and a bubble cap 22 for delivering gas into the compartment contents. Each tray is provided with a downcomer 24 which functions to establish a normal, overflow level of each compartment and to deliver overflow from each compartment to the subjacent compartment.

Situated at the top of the carbonating tower, is an ammoniated brine feed conduit 26 which is provided with a flow control valve 28. In the bottom compartment of the reaction tower is a high $CO_2$ gas conduit for introducing under pressure into the tower a gas containing a high concentration of $CO_2$. This conduit also comprises a flow control valve 32. Although not indicated in the drawing, it should be realized that gas containing $CO_2$ can be introduced into other compartments of the tower. At the bottom of the reaction tower is a slurry discharge outlet associated with a discharge conduit 34 also provided with a flow control valve 36.

Process-wise, the ammoniated brine is passed into the tower and flows generally downwardly through the tower by overflowing from each compartment through the downcomers 24 into the subjacent compartment while carbon dioxide gas is bubbled through the ammoniated brine in each compartment by means of the uprisers 20 and bubble caps 22. Reaction occurs in each compartment in accordance with the equations previously set forth herein and heat of reaction is released in the resultant liquor. The optimum reaction temperature range in this process should be 30° C. to 35° C. A portion of the released heat of reaction, particularly in the winter time, may be used in establishing and maintaining the reaction temperature within this range, if required.

To remove excess heat of reaction from the liquor in accordance with the invention, liquid pentane is introduced into the top of the reaction tower via a pentane delivery conduit 38 provided with a flow control valve 39, said introduction being adjacent to the place of introduction of ammoniated brine. The pentane flows in admixture with the ammoniated brine and resultant liquor generally downwardly through the tower by overflowing from an upper compartment to a lower compartment.

The released heat of reaction is absorbed by the pentane until, particularly in the "hot zone," it is vaporized, at which point it leaves the reaction mixture as a gas, passing upwardly in the compartments with the carbon dioxide-containing gas.

A portion of the vaporized pentane, along with other gases, such as $CO_2$, is diverted from one or more compartments, preferably the compartments most greatly affected with vaporization, and conducted into condensers 40 via an infeed conduit 42 leading from a top portion of the compartment above the normal, liquid level of said compartment, which conduit is provided with a flow control valve 44. The condenser, in each case, is operated and/or designed so that pentane is condensed, when the gas and vapors contact the cooling surfaces or tubes thereof, and thereby remove from the pentane the transmitted heat of reaction.

Uncondensed gas passes through the condenser, likewise becoming cooled, and is introduced into an upper compartment in the tower via an uncondensed gas return conduit 46 likewise provided with a flow control valve 48. In such manner, the carbon dioxide portion of the condensed gas is returned for reaction with downcoming ammoniated brine. Condensed pentane flows backwardly through the infeed conduit 42 into the compartment from whence it came, thus giving rise to a refluxing action of advantage in minimizing scale deposition in the infeed conduit.

Realizing that the trays 16 of the tower are diagrammatically shown, it should be understood that in those compartments from which vaporized pentane is to be passed into a condenser the gas passage opening 18 in the overhead tray can be blocked off or preferably restricted or the bubble cap 22 further lowered in the compartment above so as to cause all or preferably the desired portion of vapors and gas to flow into the condenser.

Pentane with absorbed heat of reaction may also leave the reaction tower along with the slurry of sodium bicarbonate formed in the tower. The slurry-pentane mixture is conveyed by the tower discharge conduit 34 into a closed-top, decantation tank having an underflow conduit 52 provided with a flow rate control valve 54, and provided with a pentane return conduit 38 which contains a pump 56 and a cooler 58 for returning to the reaction tower cooled pentane. Pentane, being essentially immiscible with water and less dense than water collects on top of the slurry by phase separation and can therefore be decanted off.

In spite of the fact that provision is made for sufficient contact of the carbon dioxide gas with the ammoniated brine, and despite the fact that the pentane is introduced into the reaction tower in a cooled condition, there will usually be some residual $CO_2$ and pentane gas, along with other gases, such as, for example, nitrogen which might have accompanied the carbon dioxide into the tower, in the uppermost compartment of the tower. To prevent a back pressure from building up in the tower gas must be vented therefrom. Accordingly, there is shown in the drawing a gas discharge conduit 60 provided with a flow control valve 62, which leads to a pentane condenser 64 wherein pentane is condensed and returned via said gas discharge conduit into the tower. Uncondensed gas, such as carbon dioxide and air, and possibly a small proportion of uncondensed pentane flow from the condenser via discharge conduit 66 provided with a flow control valve 68, and, if desired, are introduced into pentane recovery unit 70 wherein the residual pentane is removed with the aid of absorbents for pentane, such as, for example, kerosene, activated carbon and the like. Residual gases flow therefrom via waste gas conduit 72, likewise provided with a flow control valve 74, either to a vent or to a scrubber.

By suitable adjustment of the various valves located in the flowsheet, flow rates may be varied in accordance with the prevailing conditions to achieve optimum results.

Moreover, to cut out the condenser when operating without heating agent vaporization or a condenser from the tower for repair, cleaning and the like, all that needs to be done is to close the flow control valves 44 and 48 in the infeed and uncondensed gas conduits. However, to operate without heating agent vaporization as in the case of pentane, it will probably be necessary to open further the valve 39 on the pentane conduit to increase the pentane flow to the tower sufficiently to prevent vaporization of pentane in the tower.

To start up the reaction tower for the vaporization method of operation, after commencing the introduction of the reactants by opening the ammoniated brine conduit valve 28 and then opening the $CO_2$ conduit valve 32, the pentane conduit valve 39 is opened and pentane allowed to enter the tower until it commences to appear in the slurry being discharged through conduit 34. In the preferred manner of operation, that is, total retention of the pentane within the tower, the pentane conduit valve 39 is then closed or turned down until just enough pentane is fed into the tower to offset the small amount that may escape with the slurry.

To illustrate the operation of this embodiment, the following example is set forth.

*Example*

In this example the vaporization method of operation with total pentane retention in the tower is illustrated with reference to the ammonia-soda process.

The reaction tower has a height of about 70 feet, an internal diameter of about 8½ feet and contains about 50 trays. Typical conditions, such as temperature, flow rates and concentrations, which are set forth hereinafter, are those encountered in this tower for producing crude sodium bicarbonate equivalent to about 70 tons per day of soda ash.

| | |
|---|---|
| Reaction temperature in tower | 30° C. |
| Ammoniated brine | 96,600 gal./day. |
| Concentration of NaCl | 24% by wt. |
| Concentration of $NH_3$ | 8.5% by wt. |
| High $CO_2$ gas (70% by volume of $CO_2$) | 1,540,000 cu. ft./day. |
| Pentane through conduit 38 | Zero to small. |
| Pentane in tower | 1000–2000 gallons. |
| Slurry discharge through conduit 34 | 89,600 gal./day. |
| Concentration of pentane in slurry | Trace to small. |
| Waste gas through conduit 72 | 482,000 cu. ft./day. |
| Concentration of $CO_2$ | 4% by volume. |
| Concentration of pentane | Trace. |

Under these conditions, a portion of the released heat of reaction is consumed by water vaporizing from the liquor, a portion is removed by radiation, a portion is utilized in establishing and maintaining the liquor temperature, and a portion is used to heat the upflowing gas stream. About 1,500,000 B.t.u. per quantity of crude sodium bicarbonate equivalent of a ton of soda ash remains to be removed from the reaction tower. Under the conditions stated, this amounts to 105,000,000 B.t.u. per day to be removed. The heat of vaporization of pentane is about 910 B.t.u. per gallon. Hence, about 115,500 gallons of pentane will have to be evaporated within the reaction tower per day in order to remove the requisite quantity of heat. If 2,000 gallons of pentane are held in the tower, this quantity is recirculated from the tower liquor to the heat exchangers about 60 times per day or 2.5 times per hour. If 1,000 gallons of pentane are held in the tower, this quantity is recirculated twice as fast or about 5 times per hour.

The quantity of pentane which can be held in the tower after equilibrium has been established depends on the volume of tower holdup, the degree of mixing between liquor and pentane, the area of heat exchanger cooling surface, the temperature of the cooling medium used in the heat exchangers and the rate of cooling medium flow through the heat exchangers.

The holdup in the tower of this example is about 10,000 gallons of liquor. In holding 1,000 gallons of pentane in the tower, the downflowing liquor will average 10% by weight of pentane with practically no pentane leaving the tower and a concentration of up to 25–30% by weight in the zones where a large portion of the reaction takes place.

The ammoniated brine introduced into the reaction tower amounts to about 4,000 gallons per hour. With a liquor holdup of about 10,000 gallons, there is about 2.5 hours holdup in the tower. With pentane recycling between the liquor and the heat exchangers from 2.5 to 5 times per hour (pentane holdup being 1,000 to 2,000 gallons per day) there is ample time provided for the pentane to be vaporized from the liquor stream prior to its discharge from the reaction tower.

While a tray type, bubble cap, unflooded reaction tower has been illustrated because of its wider applicability, it should be understood that reaction towers in a flooded condition can also be operated in accordance with this invention. Towers in flooded condition, such as the conventional carbonating towers, are usually not provided with uprisers 20 and downcomers 24. Each tray 16 is usually in the form of an inverted cone with a passageway at the center thereof capped by a passette or mushroom within the cone. The slope of the tray or deck facilitates movement of solids such as crystalline sodium bicarbonate downwardly through the tower, thus reducing the amount of holdup of solid product in the tower and the frequency of tower blocking.

In adapting such a flooded tower to operate in accordance with this invention it is necessary that the clearance between the mushroom and the slanted tray or deck be small enough to establish and maintain a fairly high liquor velocity at that point in order to keep the liquid heat transfer agent mingled with the liquor and to prevent it from floating upwardly from one compartment to another and wind up floating on top of the ammoniated brine in the top compartment of the tower. When operating under the vaporization method conditions of this invention, the condenser infeed conduit inlets are located in the upper portion of the compartment adjacent the overhead tray and the condensers are preferably elevated above the tower to prevent liquor from flowing into them. However, if the cooling coils are internally located they are placed in the gas pocket formed between the side walls of the tower and the upper portion of the slanted tray. Preferably, float valves are used to regulate the flow of gas into the condenser and thus establish and maintain a gas pocket about the condenser infeed conduit inlets.

What is claimed is:

1. A continuous process for producing a slurry of sodium bicarbonate by bubbling a gas consisting essentially of carbon dioxide through ammoniated brine, which comprises flowing ammoniated brine downwardly as a stream through a carbonating tower while introducing said gas under pressure into a lower portion of said tower; introducing at the top of said tower a water-immiscible, inert, liquid hydrocarbon heat transfer agent and passing said heat transfer agent through said tower in admixture with said ammoniated brine whereby released heat of reaction is absorbed by said agent; discharging said agent along with the slurry of sodium bicarbonate so formed in said tower; separating said agent from said slurry; removing heat from said agent; and returning said agent to the top of said tower.

2. A process according to claim 1 wherein said agent is kerosene.

3. A process according to claim 1 wherein said agent is heavy naphtha.

4. A continuous process for producing a slurry of sodium bicarbonate by bubbling a gas consisting essentially of carbon dioxide through ammoniated brine, which comprises flowing ammoniated brine in a stream downwardly through a carbonating tower while introducing said gas under pressure into the bottom of said tower, introducing at the top of said tower a water-immiscible, inert, liquid hydrocarbon heat transfer agent having a boiling point lower than water and passing said agent through said tower in admixture with said ammoniated brine whereby released heat of reaction is absorbed by said agent, the proportion of agent being such that the absorbed heat of reaction causes it to vaporize; collecting the vapors of said agent and condensing the same by cooling; and returning condensed agent to said stream.

5. A process according to claim 4 wherein said agent is a member of the group consisting of pentane, isopentane and mixtures thereof.

6. A process according to claim 5 wherein said agent is mixed with kerosene.

7. A process according to claim 5 wherein said agent is mixed with heavy naphtha.

References Cited in the file of this patent

UNITED STATES PATENTS

| | | |
|---|---|---|
| 2,550,446 | Blohm et al. | Apr. 24, 1951 |
| 2,566,337 | Kassel | Sept. 4, 1951 |
| 2,784,806 | Ferro | Mar. 12, 1957 |
| 2,787,521 | Roberts | Apr. 2, 1957 |